(12) United States Patent
Pitchaimani et al.

(10) Patent No.: US 10,491,596 B2
(45) Date of Patent: Nov. 26, 2019

(54) SYSTEMS AND METHODS FOR CONTROLLING EMAIL ACCESS

(71) Applicant: VMware, Inc., Palo Alto, CA (US)

(72) Inventors: Saravanan Pitchaimani, Atlanta, GA (US); Vijay Pitchumani Kodaganallur, Atlanta, GA (US); Craig Newell, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 143 days.

(21) Appl. No.: 15/664,729

(22) Filed: Jul. 31, 2017

(65) Prior Publication Data

US 2019/0036934 A1 Jan. 31, 2019

(51) Int. Cl.
| | |
|---|---|
| *H04L 29/06* | (2006.01) |
| *H04L 29/08* | (2006.01) |
| *H04W 12/00* | (2009.01) |
| *H04W 12/08* | (2009.01) |
| *H04L 12/66* | (2006.01) |
| *H04L 12/58* | (2006.01) |

(52) U.S. Cl.
CPC .......... *H04L 63/102* (2013.01); *H04L 63/083* (2013.01); *H04L 63/0807* (2013.01); *H04L 63/0884* (2013.01); *H04L 63/18* (2013.01); *H04L 67/10* (2013.01); *H04L 67/125* (2013.01); *H04L 67/146* (2013.01); *H04L 67/20* (2013.01); *H04W 12/0027* (2019.01); *H04W 12/0804* (2019.01); *H04L 12/66* (2013.01); *H04L 51/22* (2013.01)

(58) Field of Classification Search
CPC ..... H04L 63/102; H04L 63/083; H04L 63/18; H04L 63/0884; H04L 67/146; H04L 12/66; H04L 51/22
See application file for complete search history.

(56) References Cited

U.S. PATENT DOCUMENTS

| | | | |
|---|---|---|---|
| 8,434,157 B1 * | 4/2013 | Wang ..................... | G06F 21/00 726/29 |
| 10,091,312 B1 * | 10/2018 | Khanwalkar ........... | H04L 67/22 |
| 10,122,719 B1 | 11/2018 | Vltavsky | |

(Continued)

OTHER PUBLICATIONS

Office Action dated Mar. 25, 2019 for U.S. Appl. No. 15/664,698.

*Primary Examiner* — Darren B Schwartz
(74) *Attorney, Agent, or Firm* — Clayton, McKay & Bailey, PC

(57) ABSTRACT

Examples described herein include systems and methods for controlling access to a server, such as an email server or a gateway, in situations where the identity of the requesting device is unknown or where the user device accesses the server using an unknown or unmanaged application. In one example, the system can utilize a user authentication credential included in the request to identify other devices belonging to the user that happen to be enrolled with the system. An out-of-band message can be sent to those enrolled devices, requesting confirmation from the user and, in conjunction with an authentication token, allowing the system to trust the previously unknown device. In the example of an unmanaged application attempting to access an email server, the system can confirm compliance of the requesting device and issue an authentication token that, along with an appropriate command sent to the email server, provides access.

20 Claims, 6 Drawing Sheets

(56) References Cited

U.S. PATENT DOCUMENTS

| | | | |
|---|---|---|---|
| 2003/0157947 A1* | 8/2003 | Fiatal | H04W 76/10 455/466 |
| 2005/0015490 A1* | 1/2005 | Saare | H04L 63/0815 709/225 |
| 2005/0268107 A1 | 12/2005 | Harris | |
| 2007/0136573 A1* | 6/2007 | Steinberg | G06F 21/32 713/155 |
| 2008/0282331 A1* | 11/2008 | Teo | H04L 63/08 726/6 |
| 2009/0260064 A1* | 10/2009 | McDowell | G06F 21/10 726/4 |
| 2009/0300744 A1* | 12/2009 | Guo | H04L 63/0823 726/7 |
| 2010/0228989 A1* | 9/2010 | Neystadt | G06F 21/10 713/185 |
| 2012/0054841 A1* | 3/2012 | Schultz | G06F 21/44 726/6 |
| 2012/0066034 A1* | 3/2012 | Nolan | G06Q 20/10 705/14.1 |
| 2012/0167162 A1* | 6/2012 | Raleigh | G06F 21/57 726/1 |
| 2013/0111554 A1* | 5/2013 | Sposato | H04L 63/20 726/4 |
| 2013/0152169 A1* | 6/2013 | Stuntebeck | H04L 67/16 726/4 |
| 2014/0189808 A1* | 7/2014 | Mahaffey | H04L 63/083 726/4 |
| 2014/0359098 A1* | 12/2014 | Xu | H04L 67/10 709/223 |
| 2015/0058936 A1* | 2/2015 | Kang | H04L 63/08 726/4 |
| 2015/0089569 A1* | 3/2015 | Sondhi | H04L 63/08 726/1 |
| 2015/0249540 A1* | 9/2015 | Khalil | H04L 63/0853 713/158 |
| 2016/0014107 A1 | 1/2016 | Hamauzu | |
| 2016/0028737 A1* | 1/2016 | Srinivasan | H04L 63/0807 726/1 |
| 2016/0182479 A1* | 6/2016 | Kaplan | H04L 51/046 726/6 |
| 2017/0111336 A1* | 4/2017 | Davis | H04L 63/08 |
| 2017/0171201 A1* | 6/2017 | Matsugashita | G06F 21/6245 |

* cited by examiner

SYSTEMS AND METHODS FOR CONTROLLING EMAIL ACCESS

BACKGROUND

Data security remains a high priority for any business or enterprise that transmits personal or confidential information remotely, such as over the internet. A critical portion of data security is authentication. User-authentication procedures can range from a simple username and password to a fully managed device that is enrolled in a system—such as an Enterprise Mobility Management ("EMM") or Mobile Device Management ("MDM") system—and uses preinstalled files or software to authenticate the device with the system.

EMM systems offer increased security by obtaining information about the type of device being connected to the network and then installing software on the device that monitors and manages connections to secure resources. EMM systems can install a profile that allows the device to be identified to a back-end server upon making a request so that the server can identify the device. Some users, however, may want to use an application that does not allow use of a profile. For example, users might use third-party mail clients that lack the ability to integrate with device profiles provided by an EMM system.

Authentication with a third-party mail client therefore can use a simple username and password to access a mail server. However, access requests from these third-party mail clients can come from unenrolled devices that are not known to the system. As a result, the enterprise or mail systems are unable to identify the device to determine if the device should be denied access, and simply deny access to a device having an identifier that is not previously known to the system. Users, however, would like to use third-party mail clients or unenrolled devices without being denied access. At the same time, administrators would like more security than simply granting access to any device that provides a request with the proper user name and password. For example, it would be desirable to deny e-mail access to a device that is jailbroken or otherwise compromised, even if the user has the correct username and password.

As a result, a need exists for improved methods of providing access to a server, including providing application-specific access, while maintaining a high level of security.

SUMMARY

Examples described herein include systems and methods for controlling access to a server, such as an email server or a gateway. In one example, the server is a gateway having privileged access to an email server. An example method can provide application-specific access to a server, even when a user accesses the server with an unmanaged email application on a user device. The example method can include receiving a request for access to the server from the user device, where the request includes a user authentication credential associated with a user and a device identifier associated with both the user device and an application being used to request access. The device identifier can be a user agent string or a portion of a user agent string.

The method can also include, in response to the request, sending an out-of-band message to the user. For example, the out-of-band message can be SMS, MMS, email, phone call, WORKSPACE ONE message, or a VMWARE VERIFY message. The out-of-band message can request confirmation from the user regarding the request for access from the user device. For example, a message can ask "did you just login?" Confirmation can be received from the user in response to the out-of-band message. The method can then include sending an authentication token to the user device. The authentication token can be specific to the user device, the user, and the application being used to request access. A database can be updated with information regarding the authentication token and the associated user device, user, and application. The method can further include providing access to the server based on receiving the user authentication credential, device identifier, and authentication token from the user device.

In one example, the method can also include sending a request for verification from the server to an identity management server, based on information associated with the request for access. The identity management server can send a check to the management server. In response, the management server can attempt to identify the user based on the information associated with the request for access. For example, an email identifier, user identifier, or password can identify the user. The management server can determine whether the user is associated with any enrolled devices. If so, the management server can then send an authentication token to the enrolled device or to the device currently being used by the user. After the user authenticates then token, the management server can send a message to the server (such as an email server or secure email gateway ("SEG")), instructing the server to provide access to the user device by, for example, placing the device on an approved list. Providing access to the server can therefore also be based on receiving an instruction from the management server.

Another example method is provided for providing access to an email server using a third-party email application on a user device. The example method can include receiving, at an identity management server, a communication from the email server. The communication can include information regarding a request for access to the email server from a user device. The method can further include sending, from the identity management server to a management server at which the user device is enrolled, a request for authorization to access the email server. The management server can identify the user based on the information regarding the request for access. With the user identified, the management server can determine whether the user is associated with any enrolled device. If no enrolled devices are found, the management server can instruct the identity management server to deny the request. If an enrolled device is found, the management server can cause an authentication token to be sent to the enrolled device, or devices. The user can authenticate the token to indicate that the original request for access originated with the user. The management server can then determine that the user device is authorized to access the email server using the third-party application. In response to determining that the user device is authorized to access the email server, the management server can send an instruction to the email server to provide the user device with access to the email server.

In one example, the identity management server can be identified by the email server based on the email address associated with the user device. For example, the email server can parse the email address of the user device and compare the domain of the email address (e.g., "@vmware.com") with entries on a lookup table that identity corresponding identity management services.

In an example, the information regarding the request for authorization to access the email server can include an identification of the application used to request access to the email server. Determining whether the user device is authorized can include determining, at the management server, whether the identified application is approved to access the email server. In some examples, determining whether the user device is authorized to access the email server can include sending an out-of-band message to the user, requesting confirmation from the user regarding the request for access from the user device, and receiving confirmation from the user in response to the message.

Determining whether the user device is authorized to access the email server can also include sending an authentication token to the user device. In that example, sending an instruction to the email server to provide the user device with access can include sending an instruction to the email server to request the authentication token from the user device, where access is contingent upon the authentication token being received at the email server The example methods summarized above can be incorporated into a non-transitory, computer-readable medium having instructions that, when executed by a processor associated with a computing device, cause the processor to perform stages for providing access to a server as described. Additionally, the example methods summarized above can be implemented in a system including, for example, an email server, a gateway, a management server, an identity management server, and a user device, or any combination thereof.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
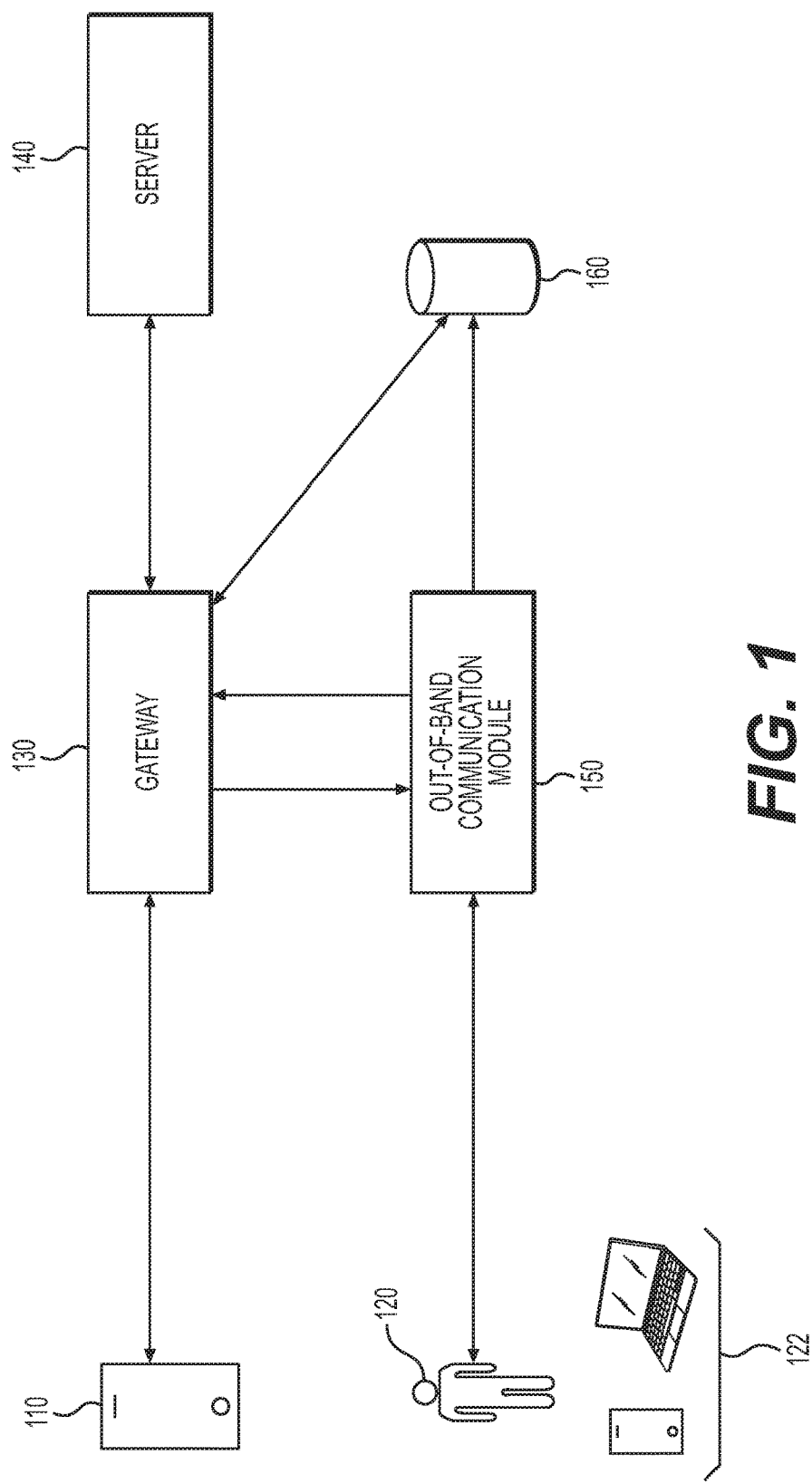
FIG. 1 is an exemplary illustration of system components for controlling access to a server.
Figure 2:
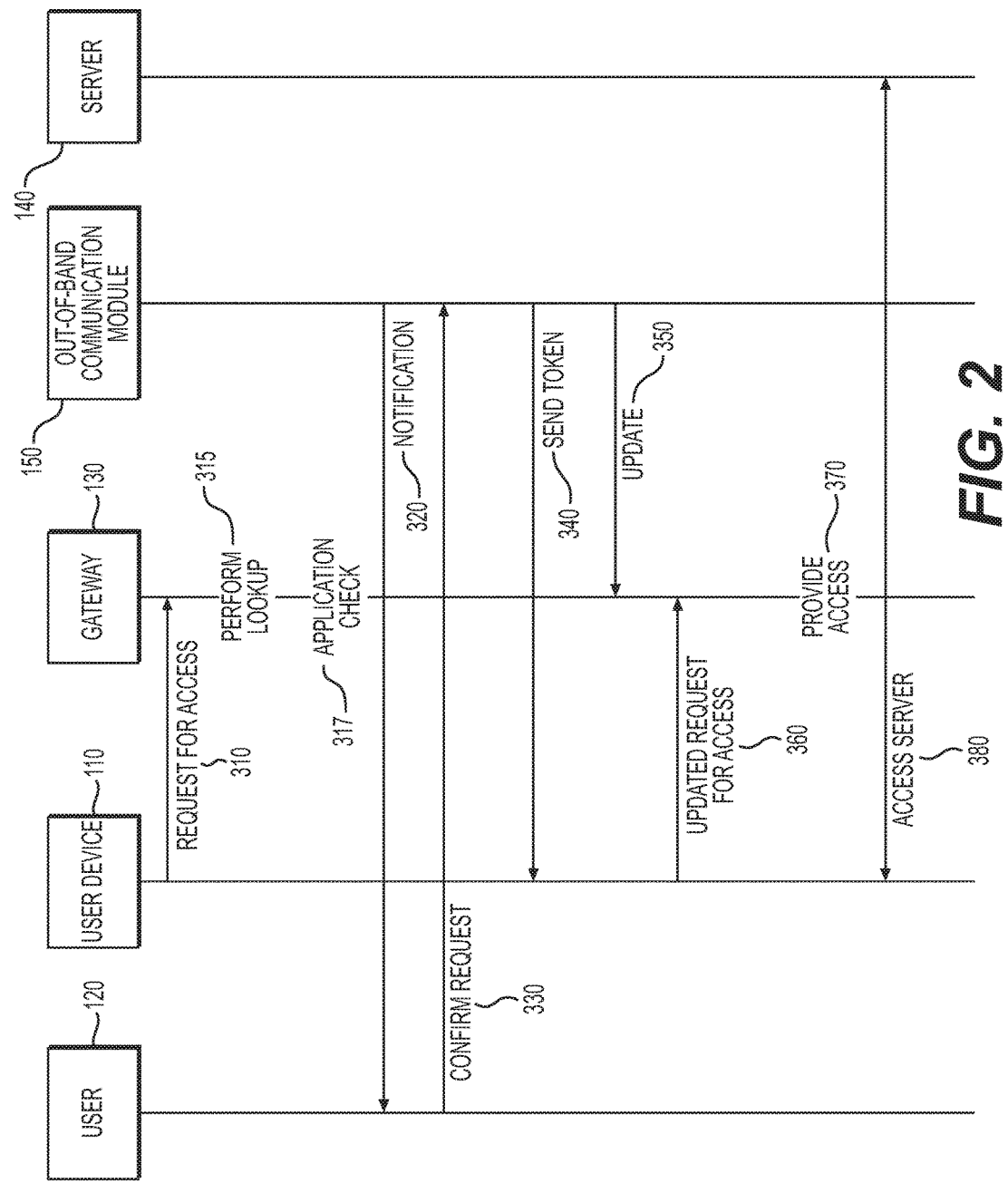
FIG. 2 is a flowchart of an exemplary method for controlling access to a server.
Figure 3:
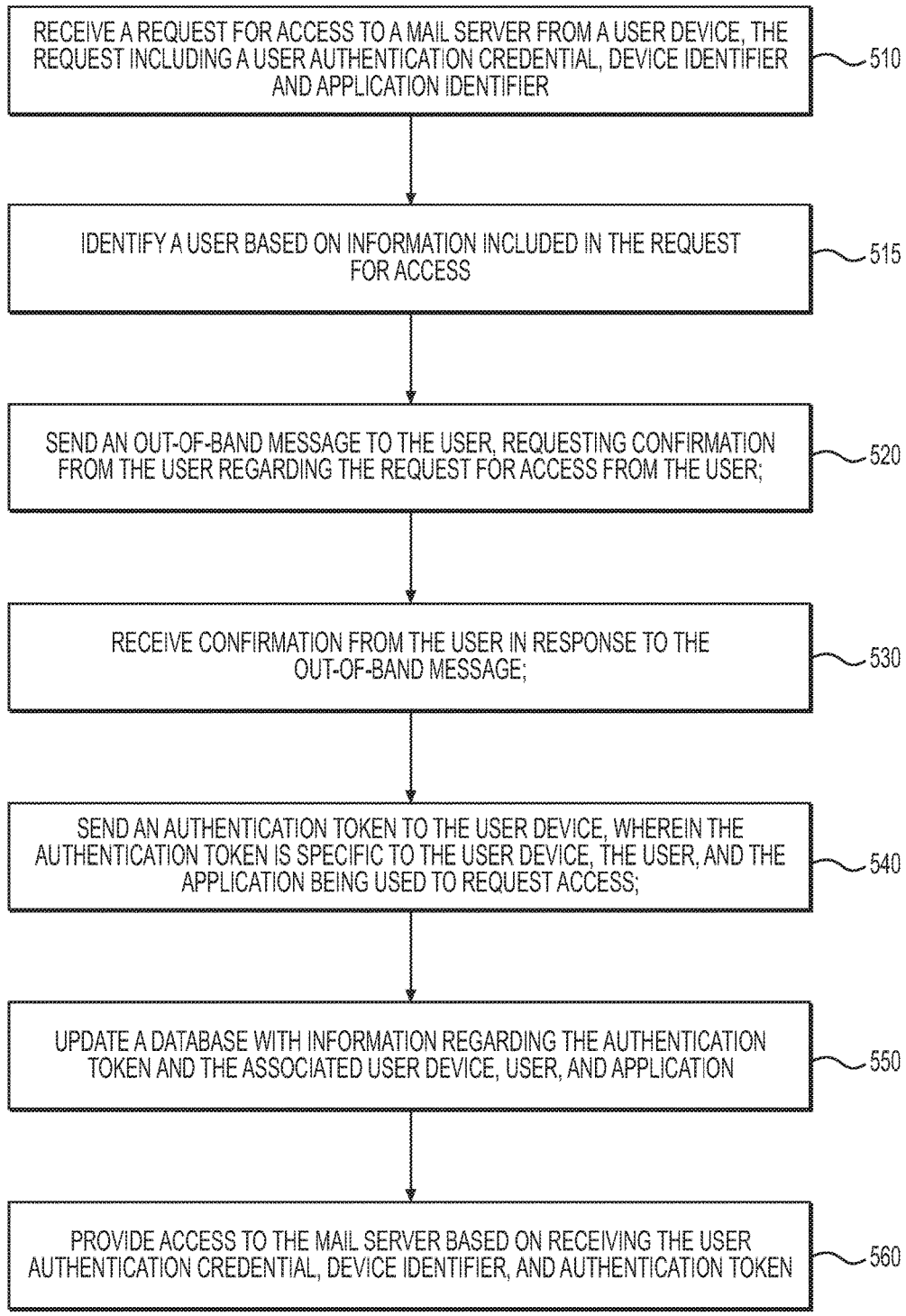
FIG. 3 is a flowchart of an exemplary method for controlling access to a server.

In a first example, systems and methods are provided for implementing a multi-factor authentication procedure for providing access to a server. The multi-factor authentication procedure can be useful in situations where an unknown user device is attempting to access the server for the first time. It can also be useful where a user device is not enrolled with an EMM or MDM system, but is attempting to access data on an enterprise server. FIG. 1 provides an illustration of this system, while FIGS. 2 and 3 provide flowcharts of example methods relating to this system.

Figure 4:
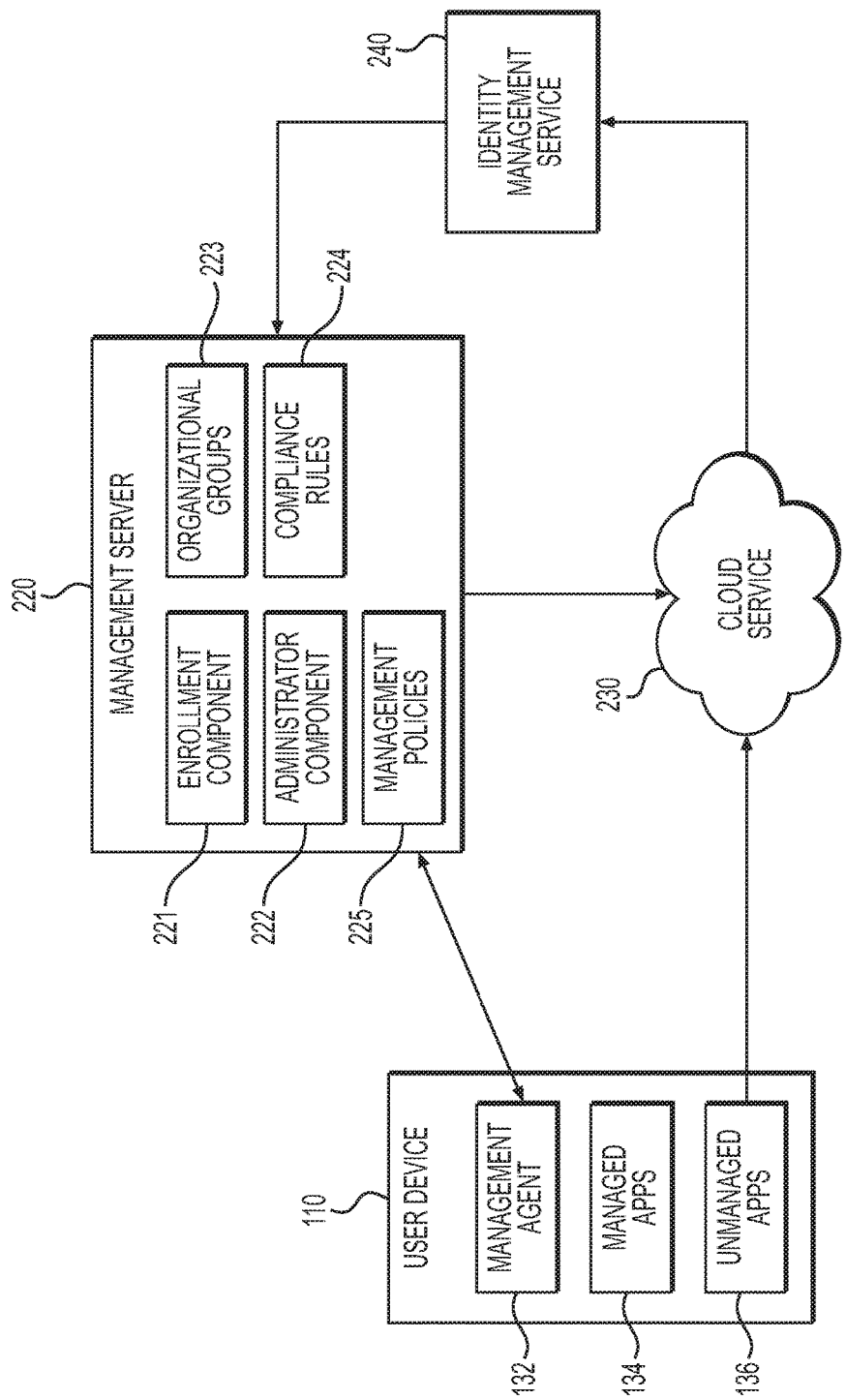
FIG. 4 is an exemplary illustration of system components for controlling access to a server.
Figure 5:
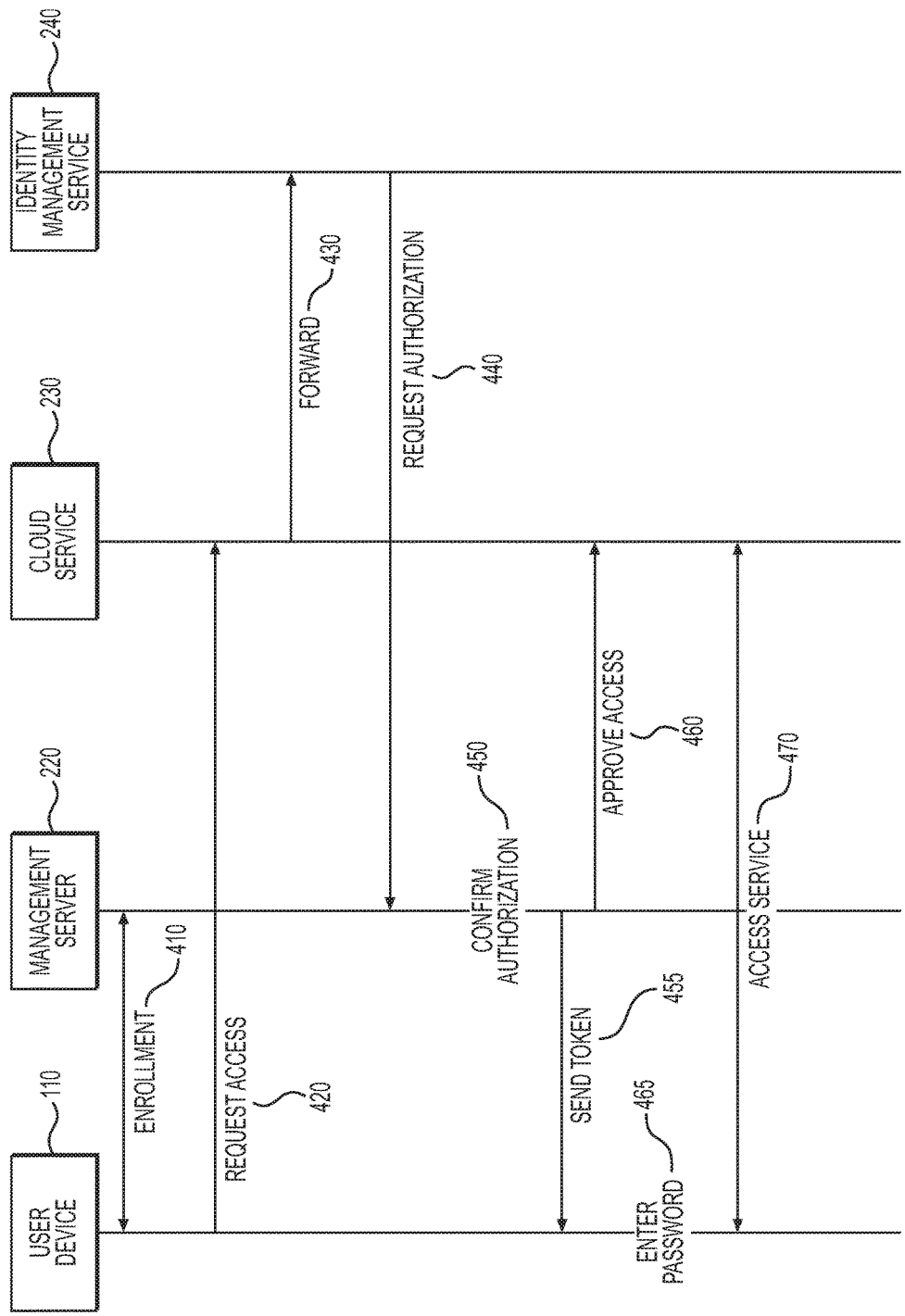
FIG. 5 is a flowchart of an exemplary method for controlling access to a server.
Figure 6:
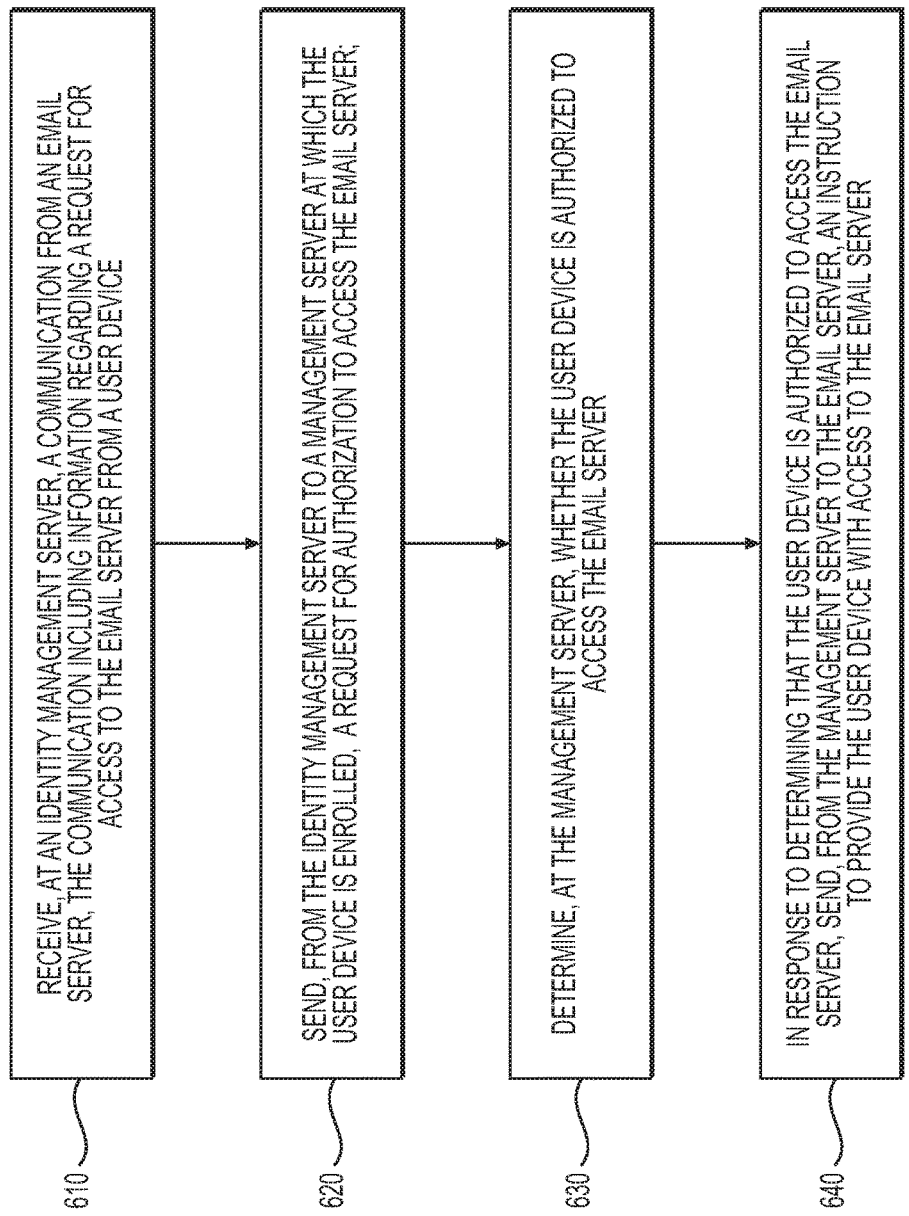
FIG. 6 is a flowchart of an exemplary method for controlling access to a server.

In a second example, systems and methods are provided for enforcing EMM or MDM constraints on access to a server, even where the server is a third-party server or a user device attempts to access the server using an unmanaged application on the user device. The server can be configured to forward access requests to an identity management service, which in turn can be configured to route access requests to a management server. The management server can identify enrolled devices of the user and authenticate the request by, for example, having the user authenticate a token. The management server can then instruct the server to provide or deny access to the user device. FIG. 4 provides an illustration of this system, while FIGS. 5 and 6 provide flowcharts of example methods relating to this system.

FIG. 1 provides an illustration of an example system for controlling access to a server 140. The server 140 can be an email server that stores and provides access to emails associated with a user 120. The server 140 can be multiple servers, processors, and computing devices, some of which can be located remotely from one another. The server 140 can be located behind an enterprise firewall, preventing unauthorized access.

A gateway 130 can control access to the server 140. In examples where the server 140 is an email server, the gateway 130 can be a SEG that receives and routs electronic messages to and from the server 140. The gateway 130 can have privileged access to the server 140, with full permission to save, delete, or otherwise alter electronic files or folders stored on the server 140. For example, the gateway 130 can utilize Kerberos Constrained Delegation ("KCD") to securely access the server 140. The gateway 130 can provide security to the server 140 and overall enterprise network by only allowing email access to devices that meet compliance guidelines set at a management server. The gateway 130 can process a device identifier and a profile, included in the request, to determine whether the request should be allowed access to the server 140. In some examples, and as explained in more detail below, the gateway 130 can process a request that does not include a known device identifier or an acceptable profile.

In some examples, the gateway 130 is separate from the server 140, such as being located on a different server, processor, or computing device. The gateway 130 can also be a different virtualized instance on the same server hardware as the server 140. In other examples, the functionality of the gateway 130 can be incorporated into the server 140 functionality, such that the two are indistinguishable from one another. The present disclosure is intended to encompass all of these potential scenarios.

A user 120 can access the gateway 130 through a user device 110. The user device 110 can be any computing device, such as a smartphone, laptop, tablet, personal computer, or workstation. A user device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The user 120 can be associated with a plurality of enrolled user devices 122. For example, the enrolled user devices 122 can be enrolled at the server 140 or at a management server associated with an EMM system to which the server 140 is also associated, as discussed in more detail below.

A user 120 can request access to the server 140 or gateway 130 by initiating a request on the user device 110. For example, the user device 110 can execute one or more email applications. These applications can be standard email applications installed as part of an operating system, such as APPLE's iOS Mail application or MICROSOFT OUT- LOOK. The applications can also be aftermarket email solutions, such as VMWARE's BOXER. The email applications can be managed by a management server that enrolls the user device 110. In other examples, the email applications can be unmanaged applications. Although email applications are discussed as examples herein, other types of applications can be used as well.

When a user 120 utilizes the user device 110 in a manner that generates a request to the server 140, such as by attempting to download new emails from the server 140, the request for access is sent from the user device 110 to the gateway 130. The request can include a user authentication credential associated with the user 120. Examples of user authentication credentials include a username and password, token, or certificate associated with the user 120.

The request for access can also include a device identifier associated with the user device 110, an application on the user device 110 being used to request access, or both. The device identifier can be, for example, an EXCHANGE ACTIVESYNC Device ID that is associated with the user device 110. The device identifier can also include information identifying, or at least implicating, the specific application being used to request access to the server 140 from the user device 110. The request can also include an application identifier, separate from, or included in, the device identifier, that identifies the application being used to request access to the server 140. The device identifier and application identifier can be included in a user agent string in some examples. The user agent string can identify an operating system type and provide some information about the client application requesting access.

Upon receiving the request for access from the user device 110, the gateway 130 can check whether the device identifier associated with the user device 110 is on a list of approved device identifiers. For example, the gateway 130 can access a lookup table stored in memory. The gateway 130 can also access stored files in a repository 160 to make the determination. The repository 160 can be a standalone memory store or server, or can be associated with the gateway 130 or the server 140, such as by being a directory or folder within a memory store of the gateway 130 or server 140. If the device identifier is on a list of approved devices, the gateway 130 can allow access to the server 140, passing the request through to the server 140 and transmitting information from the server 140 back to the user device 110.

If, however, the device identifier is not on the list of approved devices, the gateway 130 can take additional actions to authenticate the user device 110. For example, using the authentication credential associated with the user 120, the gateway 130 can identify the user purporting to make the request from the user device 110. For example, the gateway 130 can perform a lookup by accessing a management server, repository 160, or other storage location that includes information about the user 120. This information can include, for example, a user profile associated with the user 120 and a listing of enrolled devices 122 associated with the user 120, if any. Accordingly, using the information about the user in the authentication credential, the gateway 130 can cause a confirmation message to be sent to one of more of the user's 120 enrolled devices 122.

The confirmation message can be generated at the gateway 130 in one example. In another example, the gateway 130 can instruct an out-of-band communication module 150 to generate the message. The out-of-band communication module 150 can be a device separate from the gateway 130, such as a standalone computing device or server, or it can be a hardware or software module within the gateway 130 or server 140. The out-of-band communication module 150 can be a component within an EMM system, such as a management server or a device or server controlled by the management server.

The confirmation message sent by the out-of-band communication module 150 can take any form, including, for example, SMS, MMS, email, phone call, WORKSPACE ONE message, or VMWARE VERIFY message. The confirmation message can be sent from the out-of-band communication module 150 to the user 120, at a device 122 other than the user device 110 being used to request access.

The confirmation message sent by the out-of-band communication module 150 can be a notification to the user 120 or a request for confirmation by the user 120. For example, an SMS can be sent that informs the user "We received a request for access to your secure email files from a device using MICROSOFT OUTLOOK. If this request was not made on your behalf, please reset your password or contact us at security@vmware.com for assistance." In another example, the message can include an option for the user 120 to respond. For example, the user 120 can be instructed to "respond to this SMS with the word 'YES' if you made this request." Similarly, the user 120 can be instructed to respond only if the attempt was unauthorized: "respond to this SMS with the word 'NO' if you did not make this request." In yet another example, the message can include a code, such as a four-digit number, to be input at the user device 110.

Confirmation from the user 120 that they initiated the request for access from the user device 110 can come in the form of a response (such as texting "YES"), a lack of response, or entering a code at a user device 110, 122. The confirmation can be received at the out-of-band communication module 150, the gateway 130, or the server 140. When the confirmation is received, an authentication token can be sent to the user device 110.

The authentication token can be tied to the user device 110, the user 120, the application being used to request access to the server 140, or any combination thereof. For example, the authentication token can identify a device identifier associated with the user device 110 and the application. It can also identify a user 120 by, for example, identifying a profile saved at the gateway 130, repository 160, management server, or elsewhere. The authentication token can be provided to the user device 110 through any suitable mechanism, such as from an authentication server, the gateway 130, the out-of-band communication module 150, or through a service such as WORKSPACE ONE.

After the authentication token has been issued, the list of approved device identifiers can be updated. For example, the device identifier associated with the user device 110 can be updated to reflect that the user device 110 associated with the device identifier is also associated with the authentication token. In some examples, the device identifier can be added to the approved list regardless of whether the associated authentication token is present. In other examples, the device identifier can be conditionally approved provided the authentication token is provided as well.

Because the authentication token can include information about the application used to request access to the server 140, it can be used to provide conditional approval if the same application is used to request access in the future. For example, a whitelist of approved applications can be stored at the server 140, gateway 130, or repository 160. The gateway 130 can compare the application used to make a request for access to the server 140 to the whitelist of approved applications. If the application is on the whitelist, the gateway 130 can consider that application to be approved for access. The whitelist can be updated as new applications are approved or disapproved for any reason. If the user 120 attempts to request access using an application not on the whitelist, the request would not be immediately approved even if the original authentication token was provided. Instead, the authentication process can be repeated and an updated authentication token can be provided to the user 120, authenticating the new application.

Similarly, a blacklist of unapproved applications can be stored at the server 140, gateway 130, or repository 160. The blacklist can include a list of applications that are not allowed access to the server 140. If the user 120 attempts to request access using a blacklisted application, the request would be denied.

Even after providing an authentication token to the user device 110, the device's 110 authorization to access the server 140 can be revoked at any time. This can be necessary when, for example, a user 120 can unenroll the user device 110, an EMM system administrator can unenroll the device 110, or the device 110 can otherwise fall out of compliance with relevant enterprise compliance rules. When authorization needs to be revoked, the system can revoke the authentication token in one example. For example, a lookup table associated with the authentication token can be updated to reflect that the particular authentication token is no longer accepted. In another example, a lookup table associated with the device identifier can be updated to reflect that the particular device identifier associated with the device 110 is not allowed access. In this example, the gateway 130 will deny access because the device-identifier lookup will fail. The EMM system can therefore be configured to revoke access only to the unauthorized device while optionally continuing to provide access to the user's 120 other, enrolled devices 122. In yet another example, an application identifier can be placed on a blacklist such that requests from the application associated with that application identifier are blocked or denied.

FIG. 2 provides a flowchart of an example method for controlling access to a server 140. At stage 310 of the method, a request for access to the server 140 is sent from the user device 110 to the gateway 130. For example, the server 140 can be an email server and the gateway 130 can be a SEG. In that example, the request for access can include opening an email application on the user device 110 which, upon opening, checks with the server 140 for any new email messages.

The request for access to the server 140 can include a device identifier associated with the user device 110, an application on the user device 110 being used to request access, or both. The request can also include an application identifier that identifies the application being used to request access to the server 140. In some examples, the application identifier can be included in the device identifier. For example, the device identifier—and in some examples, the application identifier also—can be included in a user agent string provided with the request. In another example, the device identifier can include an indication of the application being used to request access.

At stage 315, the gateway 130 or out-of-band communication module 150 can identify the user 120 based on information included in the request. For example, the gateway 130 or out-of-band communication module 150 can perform a lookup by accessing a management server, repository 160, or other managed storage location that includes information about the user 120. This information can include, for example, a user profile associated with the user 120 and a listing of enrolled devices 122 associated with the user 120, if any. The out-of-band communication module 150 can then send a notification, such as an SMS, MMS, email, WORKSPACE ONE, or any other type of message, to the user 120 at one or more of the user's 120 enrolled devices 122.

At stage 317, the gateway 130 or out-of-band communication module 150 can perform an application check. The application check can include using the application identifier included with the request for access and comparing it to application identifiers included on a whitelist of approved application identifiers. An administrator can configure the whitelist to include or exclude certain applications, such as unsecure or harmful email applications. If the application identifier is on the whitelist, stage 320 can be carried out.

If the application identifier is on a blacklist of application identifiers to which access is to be denied, the gateway 130 can deny access. If the application identifier is unknown—i.e., not present on either of the relevant whitelists or blacklists—the request can be passed to an identity management system to identify the user 120 as discussed with respect to FIGS. 4-6. After identifying the user 120, stage 320 can be carried out.

At stage 320, the out-of-band communication module 150 sends a notification to the user 120 regarding the request made at stage 310. The out-of-band communication module 150 can be a component within an EMM system, such as a management server or a device or server controlled by the management server. The out-of-band communication module 150 can act in accordance with instructions from the gateway 130. For example, the gateway 130 can use information included in the request to determine whether the user device 110 is on a list of approved devices. If not, the gateway 130 can instruct the out-of-band communication module 150 to send a notification to the user 120.

If the notification sent at stage 320 requests confirmation from the user 120 that the request at stage 310 was properly initiated by the user 120, then at stage 330 the user 120 can confirm the request. Confirmation can include, for example, responding to an SMS, MMS, email, or WORKSPACE ONE message with a confirmation message, such as "Yes." In some examples, the lack of a response can be interpreted as a confirmation at stage 330.

Upon receiving confirmation from the user 120, the out-of-band communication module 150 can send an authentication token to the user device 110 at stage 340. The authentication token can be tied to the user device 110, the user 120, the application being used to request access to the server 140, or any combination thereof. For example, the authentication token can identify a device identifier associated with the user device 110 and the application. It can also identify a user 120 by, for example, identifying a profile saved at the gateway 130, repository 160, management server, or elsewhere. The authentication token can be provided to the user device 110 through any suitable mechanism, such as from an authentication server, the gateway 130, the out-of-band communication module 150, or through a service such as WORKSPACE ONE.

At stage 350, the out-of-band communication module 150 can update records in the system to reflect that an authentication token was provided to the user device 110. For example, the out-of-band communication module 150 can send information to the gateway 130, as shown in FIG. 2, or to the server 140 or a repository 160. The information can be used to update a list of approved device identifiers and store information regarding the association between the issued authentication token and the user device 110, user 120, and application used to access the gateway 130.

At stage 360, the user device 110 can provide an updated request for access to the gateway 130. In some examples, the gateway 130 requests an updated request that includes the authentication token issued at stage 340. Upon receiving the updated request and authentication token, the gateway 130 can compare the authentication token and other associated information with the updated information stored at the gateway 130, server 140, repository 160, or elsewhere. In other examples, the gateway 130 provides access at stage 370 without requiring an updated request for access from the user device 110.

Once the gateway 130 confirms that the user device 110 is authorized to access the server, the gateway 130 can provide access at stage 370. The user device 110 can then access the server at 380, such as by relaying requests through the gateway 130 to the server 140. The server 140 can similarly route electronic information through the gateway 130 back to the user device 110.

The device's 110 authorization to access the server 140 can be revoked at any time. When an administrator or EMM system determines authorization needs to be revoked, the system can revoke the authentication token. For example, a lookup table associated with the authentication token can be updated to reflect that the particular authentication token is no longer accepted. In another example, a lookup table associated with the device identifier can be updated to reflect that the particular device identifier associated with the device 110 is not allowed access. In this example, the gateway 130 will deny access because the device-identifier lookup will fail. The EMM system can therefore be configured to revoke access only to the unauthorized device while optionally continuing to provide access to the user's 120 other, enrolled devices 122. In yet another example, an application identifier can be placed on a blacklist such that requests from the application associated with that application identifier are blocked or denied.

FIG. 3 provides a flowchart of an example method for controlling access to a server. Stage 510 of the method includes receiving a request for access to a mail server 140 from a user device 110, where the request includes a user authentication credential. The user authentication credential can be a username and password combination associated with the user, for example. In addition to the user authentication credential, the request can include a device identifier that is associated with the user device 110, an application on the user device 110, or both. In some examples, the request includes an application identifier, separate from the device identifier, that identifies the application being used to request access. In one example, the device identifier or application identifier, or both, can be included in a user agent string submitted as part of the request for access.

At stage 515, the gateway 130 or out-of-band communication module 150 can identify the user 120 based on information included in the request. For example, the gateway 130 or out-of-band communication module 150 can perform a lookup by accessing a management server, repository 160, or other managed storage location that includes information about the user 120. This information can include, for example, a user profile associated with the user 120 and a listing of enrolled devices 122 associated with the user 120, if any. The out-of-band communication module 150 can then send a notification, such as an SMS, MMS, email, WORKSPACE ONE, or any other type of message, to the user 120 at one or more of the user's 120 enrolled devices 122.

Stage 520 of the method can include sending an out-of-band message to the user 120, requesting confirmation from the user 120 regarding the request for access from the user 120. The out-of-band message can be sent to a device 122 of the user, such as a phone or laptop computer different than the user device 110 requesting access. The message can take any form, such as an SMS, email, or other electronic communication method. The message can also be a phone call to which the user can respond by pressing buttons on a touchpad of their phone or by responding verbally.

Stage 530 of the method can include receiving confirmation from the user 120 in response to the out-of-band message. The confirmation can be provided in any format, including a format similar to that used for the out-of-band message itself. For example, if the out-of-band message is an SMS message, the user 120 can respond via SMS by, for example, typing "YES." Similarly, the user 120 can respond to an out-of-band email message by using a reply email. In some examples, confirmation can include a lack of response from the user 120 within a certain timeframe.

Stage 540 can include sending an authentication token to the user device 110. The authentication token can be tied to the user device 110, the user 120, the application being used to request access to the server 140, or any combination thereof. For example, the authentication token can identify a device identifier associated with the user device 110 and the application. It can also identify a user 120 by, for example, identifying a profile saved at the gateway 130, repository 160, management server, or elsewhere. The authentication token can be provided to the user device 110 through any suitable mechanism, such as from an authentication server, the gateway 130, the out-of-band communication module 150, or through a service such as WORKSPACE ONE.

Stage 550 can include updating a database with information regarding the authentication token and the associated user device 110, user 120, and application used to request access at stage 510. For example, the device identifier associated with the user device 110 can be updated to reflect that the user device 110 associated with the device identifier is also associated with the authentication token. The database can be accessed in response to future requests to confirm that the user device 110 has proper access to the requested server or other resource.

Stage 560 can include providing access to the mail server 140 based on receiving the user authentication credential, device identifier, and authentication token. As explained earlier, the user authentication credential can include the device identifier. The authentication token provided to the user device 110 at stage 540 can be provided by the user device 110 in an updated or supplemental request for access. In some examples, access can be provided to the mail server 140 based on the authentication token alone, without the user authentication credential or device identifier.

The descriptions above with respect to FIGS. 1-3 generally relate to examples where an unknown (or unenrolled) device requests access to a gateway or server. The examples described below, with respect to FIGS. 4-6, generally relate to situations where a device, known to the EMM system, requests access to a gateway or server using a third-party application for which EMM support is not adequately provided. For example, some third-party email applications do not include functionality for including a profile (for example, a profile pushed to the requesting device from the EMM system) with the request for access to the email server.

In some examples, and as shown in FIG. 4, a user device 110 can be enrolled with a management server 220. The management server 220 can be used to control access to a cloud service 230, such as a cloud-based email service.

Example cloud-based email services include GOOGLE APPS FOR WORK, MICROSOFT OFFICE 365 (OUTLOOK), and AMAZON WEB SERVICES.

The user device 110 can enroll with the management server 220—for example, as part of an overall EMM or MDM system. The EMM system can include multiple servers, processors, and computing devices. In some examples, the management server 220 is a network of servers, some of which can be located remotely from one another. In another example, the management server 220 is a single server with multiple purposes. In yet another example, the management server 220 can be one or more servers dedicated to the operations described herein. The management server 220 includes various components for enrollment and compliance monitoring and enforcement, which will be discussed later in this disclosure.

As part of the enrollment process, the management server 220 can cause a management agent 132 to be installed on the user device 110. The management agent 132 can be a portion of an operating system for the device 110, or it can operate in the application layer of the devices 110. For example, the management agent 132 can be a dedicated application or other software that can monitor and manage data, software components, and hardware components associated with the user device 110. The management agent 132 can monitor and control functionality and other managed applications 134 on the user device 110. The management agent 132 installed on the user device 110 can include functionality for utilizing components specific to the user device 110, such as a GPS sensor, accelerometer, or gyroscope.

The management agent 132 can be an application, or portion of an application, that provides functionality beyond simply monitoring and managing resources in the user device 110. In one example, a developer can use a SDK to insert, for example, security libraries into a managed application 134 that can communicate with the management agent 132. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management agent 132 executing in the user device 110. For example, if a security library provides the ability to monitor and enable or disable functionality provided by a managed application 134, the management agent 132 can call functions provided by the library to monitor and enable or disable the functionality.

As mentioned above, the management server 220 can include components for enrolling the user device 110 and confirming compliance. With respect to enrollment, the management server 220 can include an enrollment component 221 and an administrator component 222, either or both of which can be used for the process of enrolling a user device 110. For example, the use device 110 can communicate with the enrollment component 221 during the initial stages of enrollment. In some examples, the enrollment component 221 can provide a token to the user device 110 indicating that the device 110 has been authenticated and is permitted to communicate and enroll with the management server 220. The management server 220 or enrollment component 221 can provide the user device 110 with information regarding how to access and communicate with the administrator component 222 in order to continue the enrollment process.

In some examples, the administrator component 222 can request a token from the user device 110, indicating that the user device 110 has been authenticated and is permitted to continue the enrollment process with the administrator component 222. Upon receiving the token, the administrator component 222 can continue the enrollment process. The administrator component 222 can also provide a console for an administrator to configure and monitor the status of the user device 110 and the enrollment process. In some examples, the administrator component 222 can be dedicated to a particular enterprise or group of enterprises, while the enrollment component 221 can be shared across multiple different enterprises.

In addition to the enrollment component 221 and administrator component 222 described above, the management server 220 can include one or more organizational groups 223. An organizational group 223 can include data representing a group of devices 110 managed by the management server 220. An organizational group 223 can correspond to a structure or hierarchy of a business or enterprise, such as an engineering team, accounting team, or marketing team. In other examples, the organization group 223 can correspond to devices 110 located in a particular geographic area, such as office space, a public waiting room, a user's 120 home, or even particular floors, rooms, or portions of an office or home.

The management server 220 can also include compliance rules 224. A compliance rule 224 can set forth one or more conditions that must be satisfied in order for a user device 110 to be deemed compliant. If compliance is broken, the management server 220 can take steps to control access of the user device to enterprise files, applications, and email. Compliance rules 224 can be assigned differently to the different organizational groups 223. In addition, compliance rules 224 can be assigned differently to different devices assigned to the same user 120. Compliance rules 224 can provide access to enterprise files to the user device 110 based on the user's organization group 223 or other criteria. Meanwhile, compliance rules 224 can cause the user device 110 to be wiped if it leaves a geographic area, is jailbroken, or if the management agent 132 is removed or disabled.

In some examples, a compliance rule 224 can specify one or more triggering conditions. If a triggering condition occurs, the system can react accordingly. For example, the management server 220 can automatically perform one or more remedial actions. In another example, the management server 220 can prompt an administrator to take one or more remedial actions. In some cases, remedial actions can be staged, such that the user 120 of a user device 110 is provided with a chance to remedy their noncompliance before being subjected to stricter remedial actions.

A management policy 225 can specify that a user device 110 has permission to perform or access certain functionality. For example, the user device 110 can be restricted to certain enterprise repositories and functions within applications. A management policy 225 can also specify that a user device 110 has permission according to its organization group 223. Organizational groups 223 can change over time, but because the management policy 225 can be associated with the organizational group 223, the management policy 225 can automatically adjust a user device's 110 permission as soon as the device 110 joins or leaves an organizational group 223.

As mentioned above, the user device 110 can include managed applications 134 and unmanaged applications 136. Managed applications 134 can be controlled by the management server 220 and management agent 132 on the user device 110. For example, an administrator can set, at the management server 220, restrictions or requirements for using a managed application 134. Those restrictions or requirements can be enforced at the user device 110 by the management agent 132 on the device 110.

Unmanaged applications 136 can include third-party applications or applications that are not subject to direct control by the management server 220. In some examples, an unmanaged application 136 (such as an email application for accessing a cloud-based OFFICE 365 service) is used to access the cloud service 230. In those examples, the management server 220 may not include an application programming interface ("API") required to transmit profiles or otherwise exercise full control over the unmanaged application 136 or associated cloud service 230. The system depicted in FIG. 4 can be used to overcome these hurdles and provide an adequate level of control over access to the cloud service 230.

The system of FIG. 4 also includes an identity management service 240. The identity management service 240 can include one or more identity management servers, which can be a part of, or separate from, the management server 220. The identity management service 240 can be configured to work with the cloud service 230, such that the identity management service 240 authenticates a requesting user 120 or user device 110. The identity management service 240 can authenticate a user 120 or user device 110 by, for example, using a SAML token and associating it with a profile.

In one example, a cloud-based email server 230 can be configured to select an appropriate identity management service 240 for authentication based on the domain of email address requesting access. For example, if the user's email address is jdoe@vmware.com, the cloud service 230 can identify a specific identity management service 240 associated with the "vmware.com" domain. The authentication request can therefore be routed to the correct identity management infrastructure.

The identity management service 240 can receive the authentication request from the cloud service 230 and, using the email address, look up the user 120 in a database or lookup table associated with the "vmware" domain. In some examples, the look up is performed by contacting the management server 220 or other database associated with the domain. Based on this look up, the identity management service 240 can determine whether the user 120 is associated with any user devices 110 enrolled with the management server 220. If a user device 110 is enrolled and compliant, the identity management service 240 can issue an authentication token to the enrolled user device 110.

The user 120 can receive the authentication token through the management agent 132 or an application-management service such as WORKSPACE ONE. The user 120 can be required to authenticate the authentication token by, for example, providing a username and password combination or confirming that a particular third-party application was used to request access to the to the cloud service 230.

In another example, the authentication token can be issued by the management server 220. This allows the management server 220 to perform the determination as to whether a device 110 should be allowed access to the cloud service 230. For example, the management server 220 can confirm that the user device 110 is compliant with any applicable compliance rules 225, management policies 223, or other restrictions. When a user device 110 is not compliant, the management server 220 can withhold the authentication credential or send a "block" command to the cloud service 230, instructing the cloud service 230 to block access for the user device 110.

Alternatively, if the management server 220 determines that access should be granted, it can send the authentication credential to the user device 110 and send an "allow" command to the cloud service 230. The "allow" command can instruct the cloud service 230 to provide access to the user device 110 based on receiving the authentication credential from the user device 110.

Once an authentication token has been authenticated, the management server 220 can grant the user device 110 access to the cloud service by sending an appropriate command to the cloud service 230. The management server 220 can also update one or more lookup tables indicating that the user device 110 and the particular application used for the request are authorized for future requests. At that point, a user 120 need only enter a password when prompted by the relevant application in order to gain access to the cloud service 230. The cloud service 230 will be able to access the lookup table—either directly or by contacting the identity management service 240—to confirm that the user device 110 and application are authorized for access.

Even after an authentication token has been issued to a user device 110, the management server 220 can revoke access to the cloud service 230 if the user device 110 falls out of compliance with the compliance rules 225 or management policies 223 set at the management server 220. For example, if the management agent 132 is deleted from the user device 110, the management server 220 can determine that the device 110 is out of compliance with one or more compliance rules 225. In response, the management server 220 can send a "block" command to the cloud service 230, instructing the cloud service 230 to block access for the user device 110.

FIG. 5 provides a flowchart of an exemplary method for controlling access to a cloud service 230, such as a cloud-based email service. Stage 410 of the method can include enrollment of the user device 110 with a management server 220. Enrollment can be done as part of an overall EMM or MDM system. Enrollment can include installing a management agent 132 on the user device 110 to assist with monitoring and enforcing certain requirements at the user device 110. Enrollment at stage 410 can be performed any time prior to performing the remaining stages of FIG. 5. Alternatively, the cloud service 230 can be an email server that is not based on the cloud, such as an enterprise email server. A service in the cloud is only one example.

At stage 420, the user device 110 can request access to the cloud service 230. For example, the user device 110 can open an unmanaged application 136 associated with the cloud service 230, such as a MICROSOFT OUTLOOK application, which then sends a request to a MICROSOFT cloud service 230 as part of an initial setup. In another example, the request for access is provided when the user 120 is configuring settings for the cloud service 230, such as by inputting email-server information into an email application. In some examples, the user device 110 can make the request for access without the user 120 taking any actions, such as when the application contacts the cloud service 230 as a result of a background process.

The cloud service 230 can be configured to perform certain actions. For example, an administrator of an EMM or MDM system can configure the cloud service 230 such that it forwards access requests from unknown devices to an identity management service 240 at stage 430. The cloud service 230 can be configured to select an appropriate identity management service 240 for authentication based on the domain of email address requesting access. For example, if the user's email address is jdoe@vmware.com, the cloud service 230 can identify a specific identity management service 240 associated with the "vmware.com" domain. The authentication request can therefore be routed to the correct identity management infrastructure The identity management service 240 can perform various tasks for authenticating the requesting user device 110. In some examples, the identity management service 240 can access information provided at, or by, the management server 220, and determine that the requesting user device 110 is authorized to access the cloud service 230. In that case, the identity management service 240 can skip to stage 460 and approve access directly.

In another example, and as shown at stage 440, the identity management service 240 can identify a management server 220 at which the user device 110 is enrolled and request authorization from the management server 220. The management server 220 can then perform the determination, at stage 450, as to whether the user device 110 should be allowed access to the cloud service 230. For example, the management server 220 can confirm that the user device 110 is compliant with any applicable compliance rules 225, management policies 223, or other restrictions.

After determining that the user device 110 should be allowed access to the cloud service 230, the management server 220 can issue an authentication token at stage 455. The user 120 can receive the authentication token through the management agent 132 or an application-management service such as WORKSPACE ONE. The user 120 can be required to authenticate the authentication token by, for example, providing a username and password combination or confirming that a particular third-party application was used to request access to the to the cloud service 230.

When a user device 110 is not compliant, the management server 220 can withhold the authentication credential or send a "block" command to the cloud service 230, instructing the cloud service 230 to block access for the user device 110. Alternatively, if the management server 220 determines that access should be granted, it can send the authentication credential to the user device 110 and send an "allow" command to the cloud service 230. The "allow" command can be sent to the cloud service 230 at stage 460, as shown in FIG. 5. The management server 220 can also update one or more lookup tables indicating that the user device 110 and the particular application used for the request are authorized for future requests.

At stage 465, the user device 110 is prompted for a password to access the cloud service 230. The password can be the user's 120 email password for the cloud service 230, a password associated with the management server 220 or EMM system, or another password. Finally, at stage 470, the cloud service 230 can allow access to the user device 110 such that information can pass back and forth between the cloud service 230 and user device 110 as needed.

FIG. 6 provides a flowchart of an example method for controlling access to an email server. Stage 610 of the method can include receiving, at an identity management server 240, a communication from an email server 140. The communication can include information regarding a request for access to the email server 140 from a user device 110. For example, the identity management server 240 can receive a communication from a cloud-based email server that selects the identity management server 240 based on a domain associated with the email address of a requesting user device 110.

Stage 620 can include sending, from the identity management server 240 to a management server 220 at which the user device 110 is enrolled, a request for authorization to access the email server 140. The identity management server 240 can look up the appropriate management server 220 at a database associated with the domain of the requesting email address and forward the request to the management server 220.

Stage 630 can include determining, at the management server 220, whether the user device 110 is authorized to access the email server 140. For example, the management server 220 can confirm that the user device 110 is compliant with the applicable compliance rules 225, management policies 223, or other restrictions. When a user device 110 is not compliant, the management server 220 can withhold the authentication credential or send a "block" command to the cloud service 230, instructing the cloud service 230 to block access for the user device 110. Alternatively, if the management server 220 determines that access should be granted, it can send the authentication credential to the user device 110 and send an "allow" command to the cloud service 230 at stage 640. The "allow" command can instruct the cloud service 230 to provide access to the user device 110 based on receiving the authentication credential from the user device 110.

Although the embodiments associated with FIGS. 1-6 are generally directed toward examples where either the user's identity is unknown or the requesting application is unknown, additional embodiments are contemplated where both the user's identity and the requesting application are unknown at the time of the initial request for access. In that example, a level of trust can be formed for an unknown device using an unknown application.

For example, referencing FIG. 1, when a request is received at a gateway 130 and the device identifier lookup fails (because, for example, the device identifier has not been added to a whitelist or other approved list of device identifiers), the gateway 130 can send a request to the identity management service 240 of FIG. 4 to identify a user associated with the device identifier. The identity management service 240 can use the email address to look up the user in a database or lookup table associated with the domain of the email address, such as "vmware.com." Based on this lookup, the system can identify the user and any enrolled devices associated with the user.

If one or more enrolled devices associated with the user are identified, a request for confirmation can be sent to one or more of those enrolled devices in accordance with stages 320 and 330 of FIG. 2. Once confirmed, an authentication token can be provided to the requesting device as described with respect to stage 340 of FIG. 2 and stage 455 of FIG. 5. A management server can approve access to the server as described in stage 460 of FIG. 5, such as by sending an "allow" command to the relevant server or cloud service. From there, authorization can be revoked using any of the mechanisms described in FIGS. 1-6, as appropriate.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing access to an email server, comprising:
receiving, at an identity management server, a communication from the email server, the communication including information regarding a request for access to the email server from a user device;
in response to receiving the communication from the email server at the identity management server, sending, from the identity management server to a management server at which the user device is enrolled, a request for authorization to access the email server;
determining, at the management server, whether the user device is authorized to access the email server; and
in response to the management server determining that the user device is authorized to access the email server:
sending an authentication token from the management server to the user device; and
sending, from the management server to the email server, an instruction to provide the user device with access to the email server.

2. The method of claim 1, wherein the identity management server is identified to receive the communication from the email server based on a domain of an email address associated with the user device.

3. The method of claim 1, wherein determining whether the user device is authorized to access the email server comprises confirming that the user device is compliant with a compliance rule enforced at the management server.

4. The method of claim 1, wherein the information regarding the request for access to the email server from the user device includes an identification of an application on the user device used to request access to the email server.

5. The method of claim 1, wherein the information regarding the request for authorization to access the email server includes the identification of an application used to request access to the email server, and wherein determining whether the user device is authorized comprises determining, at the management server, whether the identified application is approved to access the email server.

6. The method of claim 1, wherein determining whether the user device is authorized to access the email server comprises:
sending an out-of-band message to the user, the message requesting confirmation from the user regarding the request for access from the user device; and
receiving confirmation from the user in response to the out-of-band message.

7. The method of claim 1, wherein sending an instruction to the email server to provide the user device with access further comprises sending an instruction to the email server to request the authentication token from the user device, wherein access is contingent upon the authentication token being received at the email server.

8. A non-transitory, computer-readable medium comprising instructions that, when executed by a processor associated with a computing device, cause the processor to perform stages for providing access to an email server, the stages comprising:
receiving, at an identity management server, a communication from the email server, the communication including information regarding a request for access to the email server from a user device;
in response to receiving the communication from the email server at the identity management server, sending, from the identity management server to a management server at which the user device is enrolled, a request for authorization to access the email server;
determining, at the management server, whether the user device is authorized to access the email server; and
in response to the management server determining that the user device is authorized to access the email server:
sending an authentication token from the management server to the user device; and
sending, from the management server to the email server, an instruction to provide the user device with access to the email server.

9. The non-transitory, computer-readable medium of claim 8, wherein the identity management server is identified to receive the communication from the email server based on a domain of an email address associated with the user device.

10. The non-transitory, computer-readable medium of claim 8, wherein determining whether the user device is authorized to access the email server comprises confirming that the user device is compliant with a compliance rule enforced at the management server.

11. The non-transitory, computer-readable medium of claim 8, wherein the information regarding the request for access to the email server from the user device includes an identification of an application on the user device used to request access to the email server.

12. The non-transitory, computer-readable medium of claim 8, wherein the information regarding the request for authorization to access the email server includes the identification of an application used to request access to the email server, and wherein determining whether the user device is authorized comprises determining, at the management server, whether the identified application is approved to access the email server.

13. The non-transitory, computer-readable medium of claim 8, wherein determining whether the user device is authorized to access the email server comprises:
sending an out-of-band message to the user, the message requesting confirmation from the user regarding the request for access from the user device; and
receiving confirmation from the user in response to the out-of-band message.

14. The non-transitory, computer-readable medium of claim 8, wherein sending an instruction to the email server to provide the user device with access further comprises sending an instruction to the email server to request the authentication token from the user device, wherein access is contingent upon the authentication token being received at the email server.

15. A system for providing access to an email server, comprising:
an identity management server; and
a management server at which a user device is enrolled, wherein:
the identity management server receives a communication from the email server, the communication including information regarding a request for access to the email server from the user device,
in response to receiving the communication from the email server at the identity management server, the identity management server sends, to a management server at which the user device is enrolled, a request for authorization to access the email server,
the management server determines whether the user device is authorized to access the email server, and in response to the management server determining that the user device is authorized to access the email server the management server:
  sends an authentication token to the user device; and
  sends, to the email server, an instruction to provide the user device with access to the email server.

16. The system of claim 15, wherein the identity management server is identified to receive the communication from the email server based on a domain of an email address associated with the user device.

17. The system of claim 15, wherein determining whether the user device is authorized to access the email server comprises confirming that the user device is compliant with a compliance rule enforced at the management server.

18. The system of claim 15, wherein the information regarding the request for access to the email server from the user device includes an identification of an application on the user device used to request access to the email server.

19. The system of claim 15, wherein the management server determines whether the user device is authorized to access the email server by:
  sending an out-of-band message to the user, the message requesting confirmation from the user regarding the request for access from the user device; and
  receiving confirmation from the user in response to the out-of-band message.

20. The system of claim 15, wherein sending an instruction to the email server to provide the user device with access further comprises sending an instruction to the email server to request the authentication token from the user device, wherein access is contingent upon the authentication token being received at the email server.

* * * * *